United States Patent [19]

Yoshida et al.

[11] 4,029,842
[45] June 14, 1977

[54] TRANSPARENT COATED RESIN COMPOSITE

[75] Inventors: Masaru Yoshida; Hiroshi Okubo; Isao Kaetsu, all of Takasaki, Japan

[73] Assignee: Japan Atomic Energy Research Institute, Tokyo, Japan

[22] Filed: Sept. 2, 1975

[21] Appl. No.: 609,857

[30] Foreign Application Priority Data

Sept. 5, 1974 Japan .......................... 49-101417

[52] U.S. Cl. ................................ 428/334; 428/447; 428/448; 428/451; 428/339; 427/164; 427/407 G

[51] Int. Cl.² .................... B29D 11/00; G02C 7/02; B32B 27/08

[58] Field of Search .......... 428/447, 355, 413, 448, 428/451, 500, 334

[56] References Cited

UNITED STATES PATENTS

| | | | |
|---|---|---|---|
| 3,160,551 | 12/1964 | Buetow et al. | 428/447 |
| 3,698,982 | 10/1972 | Griffin | 428/447 |
| 3,749,593 | 7/1973 | Keiser | 428/447 |

Primary Examiner—Ralph S. Kendall
Attorney, Agent, or Firm—Ladas, Parry, Von Gehr, Goldsmith & Deschamps

[57] ABSTRACT

A transparent coated resin composite comprising: (a) a resin substrate mainly comprising polymethyl methacrylate, (b) a precoating which is formed of a silicon compound selected from the group consisting of methacryloxyalkyltrialkoxysilanes, aminoalkyl-trialkoxysilanes, vinyltris(alkoxyalkoxy)silanes, vinyltrialkoxysilanes and hydrolysates thereof on said substrate, and (c) an over-coating which is formed of a silicon compound selected from the group consisting of glycidoxyalkyltrialkoxysilanes, N-aminoalkylaminoalkyl-trialkoxysilanes, (3,4-epoxycyclohexyl)alkyltrialkoxysilanes and hydrolysates thereof on said precoating is provided. The over-coating may contain other polymerizable monomers. The over-coating which provides the substrate with the good abrasion resistance and anti-fogging property is firmly bonded to the substrate by virtue of the precoating and exhibits excellent abrasion resistance as well as anti-fogging property without impairing the optical characteristics of methyl methacrylate resins.

6 Claims, No Drawings

TRANSPARENT COATED RESIN COMPOSITE

BACKGROUND OF THE INVENTION

This invention relates to a transparent coated composite which is formed by applying a precoating and then an over-coating on a substrate mainly comprising polymethyl methacrylate, said composite having excellent surface abrasion resistance and extremely good adhesion or bonding between the coated films and the substrate.

Among the materials known as transparent organic glass, presently the most commonly used material is polymethyl methacrylate. This resin is excellent in transparency, weatherability, etc., but is dissatisfactory in that the surface of the products of this resin is easily scratched. Improvement in abrasion resistance of the resin is therefore desired in various fields of use thereof. In this regard, many investigations have been made by now, but all of those have both merits and demerits and do not give the resin practically satisfactory properties.

For example, Japanese Patent Publication No. 17847/60 discloses a process for improving surface hardness of polymethyl methacrylate by applying a cross-linking monomer such as diethylene or triethylene glycol dimethacrylate, a $C_3$–$C_6$ alkane diol dimethacrylate, etc. filmily inside a mold, followed by cast polymerization of methyl methacrylate therein. Japanese Patent Publication No. 9827/62 discloses a process for improving surface hardness of polymers such as polymethyl methacrylate by applying a mixture of a cross-linking monomer such as allyl methacrylate, ethylene dimethacrylate, etc. and a polymerization catalyst inside a mold. Then placing a polymer body previously made by said mold in contact with the applied cross-linking monomer coating and heating the system. Japanese Laying-Open Publication No. 26419/72 discloses a process in which a solution of a hydrolysate of an alkyl silicate such as butyl silicate in admixture with, e.g., a copolymer of vinyltriethoxysilane and vinyl acetate in a solvent is applied on a polymethyl methacrylate plate, which is then heated so as to cure the coating.

However, the processes described in Japanese Patent Publication Nos. 17847/60 and 9827/62 have defects in that prolonged time is required for curing and the surface of the products is insufficient in abrasion resistance. Also the process described in Japanese Laying-Open Publication No. 26419/72 has a fatal defect in heat resistance of the product. That is, when heated at 80° C or higher for a few minutes, the cured coating on the surface of polymethyl methacrylate resin cracks and loses its optical characteristics.

For the purpose of overcoming these defects we made many studies and previously found that a silicon compound of the undermentioned Group II or a mixture of the silicon compound of Group II and a polymerizable monomer of the undermentioned Group III (or its polymer) has high abrasion resistance.

Said silicon compound or the mixture thereof with said polymerizable monomer can be coated on a transparent plastic substrate and cured to successfully impart excellent abrasion resistance to the substrate. However, the cured coating formed on a substrate mainly comprising polymethyl methacrylate, which provides the substrate with abrasion resistance, is not sufficiently bonded to the resin substrate. Therefore, further measures to strengthen the adhesion or bonding between the coating and the substrate had to be searched for. In this regard, we tried various measures for the improvement and have accomplished this invention.

SUMMARY OF THE INVENTION

The present invention provides a transparent coated composite comprising a resin substrate mainly comprising polymethyl methacrylate (i.e., containing at least 80% of methyl methacrylate unit); a cured coating (precoating) of a silicon compound of the following Group I which is formed on the substrate, and another cured coating (over-coating) of a silicon compound of the following Group II or a mixture of a silicon compound of Group II and a polymerizable monomer of the following Group III (which may be a polymeric form thereof), said over-coating being formed on said precoating.

GROUP I:

methacryloxyalkyl-trialkoxysilanes of the formula

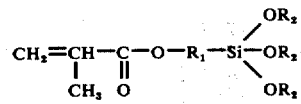

wherein $R_1$ is an alkylene having 1 – 6 carbon atoms and $R_2$ is an alkyl, having 1 – 6 carbon atoms, and hydrolysate thereof;

aminoalkyl-trialkoxysilanes of the formula

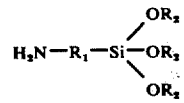

wherein $R_1$ and $R_2$ are as defined above, and hydrolysate thereof;

vinyltrisalkoxyalkoxy)silanes of the formula

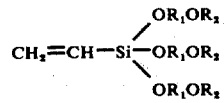

wherein $R_1$ and $R_2$ are as defined above, and hydrolysate thereof, and vinyltrialkoxysilanes of the formula

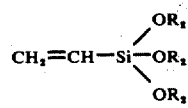

wherein $R_2$ is as defined above, and hydrolysate thereof.

GROUP II glycidoxyalkyltrialkoxysilanes of the formula

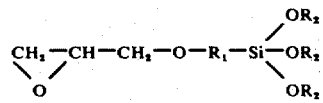

wherein $R_1$ and $R_2$ are as defined above, and hydrolysate thereof;

(3,4-epoxycyclohexyl)alkyl-trialkoxysilanes of the formula

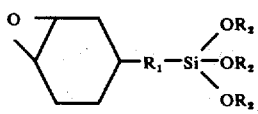

wherein $R_1$ and $R_2$ are as defined above, and hydrolysate thereof;

N-aminoalkyl-aminoalkyl-trialkoxysilanes of the formula

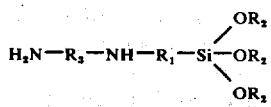

wherein $R_1$ and $R_2$ are as defined above and $R_3$ is an alkylene having 1 – 6 carbon atoms, and hydrolysate thereof.

GROUP III glycidyl acrylate, glycidyl methacrylate, hydroxyethyl acrylate, hydroxyethyl methacrylate, hydroxypropyl acrylate, hydroxypropyl methacrylate, acrylic acid, acrylamide, methacrylic acid, methacrylamide, acrylic salts and methacrylic salts.

In the case where a mixture of the silicon compound of Group II and the polymerizable monomer of Group III or its polymer is used to form the over-coating, the mixing ratio of the two components may be such that the compound of Group II occupies 98 – 50%, preferably 95 – 60% and more preferably 90 – 70% by weight. In each of Groups I - III, two or more compounds may be selected from the respective group for combined use at any mixing ratio.

In accordance with the present invention, a polymethyl methacrylate base substrate is first coated with a cured film of a silicon compound of Group I and then coated with a cured film of a silicon compound of Group II or a mixture of a Group II silicon compound and a monomer of Group III or its polymer, which gives a transparent coated composite with increased practical usefulness having excellent abrasion resistance and strong adhesion or bonding between the substrate and the cured coatings.

DETAILED DESCRIPTION OF THE INVENTION

In the process of this invention, the substrate comprising polymethyl methacrylate is first coated with a compound of Group I, which is then cured. In order to effect the coating and curing efficiently and uniformly, it is preferred to apply on the substrate the compound of Group I which has previously been polymerized until a suitable viscosity (50–150 cp) is attained by heating it together with a catalyst or applying light or an ionizing radiation thereto, and further heating so as to complete the curing. Of course the compound of Group I to which a catalyst has been added may be directly applied to the substrate and cured. A solvent can be used in preparation of the coating materials (solutions).

The catalyst used in this invention includes acids such a perchloric acid, hydrochloric acid, bromic acid, iodic acid, nitric acid, phosphoric acid, sulfuric acid, sulfonic acid, p-toluenesulfonic acid, oxalic acid, chlorosulfonic acid and tartaric acid; $BF_3$ and complexes thereof with electron donators; Lewis acids such as $SnCl_4$, $ZnCl_2$, $FeCl_3$, $AlCl_3$, $SbCl_5$, $TiCl_4$, etc. and complexes thereof; metal octylates such as zinc octylate, cobalt octylate, iron octylate, tin octylate, etc.; metal naphthates such as zinc naphthate, calcium naphthate, cobalt naphthate, iron naphthate, copper naphthate, nickel naphthate, manganese naphthate, etc.; di-n-butyl-tin dilaurate; borates such as zinc borate, cobalt borate, sodium borate lead borate, etc.; organoboric esters such as ethyl borate, methyl borate, triphenyl borate, etc.; alkalis such as potassium and sodium hydroxide; and radical polymerization catalysts, for example, azo compounds such as 2,2'-azobisisobutyronitrile, 2,2'-azobis-2-methylvaleronitrile and 1,1'-azobis-1-cyclohexanedinitrile, hydroperoxides such as 2-cyclohexenylhydroperoxide, 1-methylcyclohexylhydroperoxide, cumen hydroperoxide and tetralin hydroperoxide, and peroxides such as diisopropyl peroxides, di-tert-butyl peroxides, di-α-cumyl peroxides, acetyl peroxide, lauroyl peroxide, benzoyl peroxide, phthaloyl peroxide, p,p'-dimethylbenzoyl peroxide, p,p' -dichlorobenzoyl peroxide, hydrogen peroxide, ammonium persulfate, potassium persulfate, etc. Of course, redox catalysts can be used, too. Some of these catalysts are hydrolyzing agents. When the silicon compounds of Group I is hydrolyzed, they polymerize by condensation. Therefore, these are included in the curing catalysts.

When the viscosity of the compound of Group I is increased by means of light or an ionizing radiation, visible or ultraviolet light of wavelength of 7000 - 1900 A° is used or γ-rays, β-rays, electron beams, α-beams, X-rays or neutron beams are employed at a dose rate of $10^2 - 10^9$ R/hr.

Following the formation of a cured precoating of the compound of Group I on the substrate, a cured over-coating of a silicon compound of Group II or its admixture with a monomer of Group III or the polymer thereof is formed thereon. For this purpose a compound of Group II or a mixture of the compound of Group II and a monomer of Group III to which a catalyst is added may be directly applied and then heated and cured. Alternatively, a liquid material, i.e., a compound of Group II or a mixture thereof with a monomer of Group III or its polymer to which a catalyst is added may be pretreated to advance the curing reaction to such a degree that the viscosity of the liquid material is increased to 50 – 150 cp, then applied on the cured coating of the compound of Group I and finally cured.

In the latter case, the increase in viscosity of the liquid material may be effected by heating in the presence of a catalyst such as those employed in the reaction of the compounds of Group I or otherwise by applying light or an ionizing radiation as well. In order to complete the curing reaction, it is necessary to heat the liquid material to which a catalyst selected from those described with respect to the reaction of the compounds of Group I has been added. Even in the case of increasing the viscosity of the liquid material by means of light or an ionizing radiation, the liquid material should contain a curing catalyst for complete curing of the coated film.

The coated films obtained by forming a cured precoating of a silicon compound of Group I and then a cured over-coating of a silicon compound of Group II or a mixture thereof with a monomer of Group III or its polymer have high abrasion resistance and well bonded to the substrate and gives a firmly united transparent coated composite. The thus obtained transparent composite has good heat resistance, weatherability and chemical resistance. Particularly almost all of those composites provided with a cured coating of the mixture of the compound of Group II and the monomer of Group III or its polymer possess so-called anti-fogging property, that is, they are not or little fogged when placed in an atmosphere of high humidity or on the boundary between the two spaces with great difference in temperature and humidity, or any other such conditions. Therefore, the products of this invention are of good practical use.

The thickness of the two cured coating can be controlled by varying the viscosity of the respective coating solution. The thickness of the precoating is not critical. Existence of the precoating per se is significant and the thinner the better. The total thickness of the two coatings is in the range of 0.0001 – 0.5 mm, preferably 0.001 – 0.1 mm, more preferably 0.001 – 0.05 mm.

Examples of the silicon compounds of Group I usable in the present invention include methacryloxymethyl-trimethoxysilane, methacryloxymethyl-triethoxysilane, methacryloxymethyl-tributoxysilane, methacryloxymethyl-tripropoxysilane, methacryloxyethyl-trimethoxysilane, methacryloxyethyl-triethoxysilane, methacryloxyethyl-tributoxysilane, methacryloxyethyl-tripropoxysilane, methacryloxybutyl-trimethoxysilane, methacryloxybutyl-triethoxysilane, methacryloxybutyl-tributoxysilane, methacryloxybutyl-tripropoxysilane, methacryloxypropyl-trimethoxysilane, methacryloxypropyl-triethoxysilane, methacryloxypropyl-tributoxysilane, methacryloxypropyl-tripropoxysilane, aminomethyl-trimethoxysilane, aminoethyl-triethoxysilane, aminomethyl-tributoxysilane, aminomethyl-tripropoxysilane, β-amino-ethyl-trimethoxysilane, β-aminoethyl-triethoxysilane, β-amino-ethyl-tributoxysilane, β-aminoethyl-tripropoxysilane, α-amino-ethyl-trimethoxysilane, α-aminoethyl-triethoxysilane, αamino-ethyl-tributoxysilane, αaminoethyl-tripropoxysilane, γ-amino-propyl-trimethoxysilane, γ-aminopropyl-triethoxysilane, γ-amino-propyl-tributoxysilane, γ-amino-propyl-tripropoxysilane, β-amino-propyl-trimethoxysilane, β-aminopropyl-triethoxysilane, β-amino-propyl-tripropoxysilane, β-aminopropyl-tributoxysilane α-amino-propyl-trimethoxysilane, α-aminopropyl-triethoxysilane, α-amino-propyl-tributoxysilane, α-amino-propyl-tripropoxysilane, vinyl-tris(methoxymethoxy)silane, vinyl-tris(methoxyethoxy)silane, vinyl-tris(methoxypropoxy) silane, vinyl-tris(methoxybutoxy) silane, vinyl-tris(ethoxymethoxy)silane, vinyl-tris(ethoxyethoxy) silane, vinyl-tris(ethoxypropoxy)silane, vinyl-tris(ethoxybutoxy) silane, vinyl-tris(propoxymethoxy)silane, vinyl-tris(propoxyethoxy)silane, vinyl-tris(propoxypropoxy)silane, vinyl-tris(propoxybutoxy)silane, vinyl-tris(butoxymethoxy)silane, vinyl-tris(butoxyethoxy)silane, vinyl-tris(butoxypropoxy)silane, vinyl-tris(butoxybutoxy)silane, vinyltrimethoxysilane, vinyltriethoxysilane, vinyltripropoxysilane, vinyltributoxysilane, etc.

The silicon compounds of Group II used in the present invention are exemplified by glycidoxymethyl-trimethoxysilane, glycidoxymethyl-triethoxysilane, glycidoxymethyl-tripropoxysilane, glycidoxymethyl-tributoxysilane, β-glycidoxyethyltrimethoxysilane, β-glycidoxyethyl-triethoxysilane, β-glycidoxyethyl-tripropoxysilane, β-glycidoxyethyl-tributoxysilane, β-glycidoxyethyl-trimethoxysilane, α-glycidoxyethyl-triethoxysilane, α-glycidoxyethyl-tripropoxysilane, α-glycidoxyethyl-tributoxysilane, γ-glycidoxypropyl-trimethoxysilane, γ-glycidoxypropyl-triethoxysilane, γ-glycidoxypropyl-tripropoxysilane, γ-glycidoxypropyl-tributoxysilane, β-glycidoxypropyl-trimethoxysilane, β-glycidoxypropyl-triethoxysilane, β-glycidoxypropyl-tripropoxysilane, β-glycidoxypropyl-tributoxysilane, α-glycidoxypropyl-trimethoxysilane, α-glycidoxypropyl-triethoxysilane, α-glycidoxypropyl-tripropoxysilane, α-glycidoxypropyl-tributoxysilane, δ-glycidoxybutyl-trimethoxysilane, δ-glycidoxybutyl-triethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyl-triporpoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, δglycidoxybutyl-tributoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl)butyl-triethoxysilane, (3,4-epoxycyclohexyl)-butyl-tripropoxysilane, (3,4-epoxycyclohexyl)butyl-tributoxysilane, N-aminomethyl-aminoethyl-trimethoxysilane, N-aminomethylaminomethyl-triethoxysilane, N-aminomethyl-aminomethyl-tripropoxysilane, N-aminomethyl-β-aminoethyl-trimethoxysilane, N-aminomethyl-β-aminoethyl-triethoxysilane, N-aminoethyl-β-aminoethyl-tripropoxysilane, N-aminomethyl-α-aminoethyl-trimethoxysilane, N-aminomethyl-α-aminoethyl-tripropoxysilane, N-aminomethyl-γ-aminopropyl-trimethoxysilane, N-aminomethyl-γ-aminopropyl-triethoxysilane, N-aminomethyl-γ-aminopropyl-tripropoxysilane, N-aminomethyl-β-aminopropyl-trimethoxysilane, N-aminomethyl-β-aminopropyl-triethoxysilane, N-aminomethyl-β-aminopropyl-tripropoxysilane, N-aminopropyl-tripropoxysilane, -aminopropyl-trimethoxysilane, N-aminomethyl-α-aminopropyl-triethoxysilane, N-aminomethyl-α-aminopropyl-tripropoxysilane, N-(β-aminoethyl)aminomethyl-trimethoxysilane, N-(β-aminoethyl)aminomethyl-triethoxysilane, N-(β-aminoethyl)aminomethyl-tripropoxysilane, N-(γ-aminopropyl)-aminomethyl-trimethoxysilane, N-(γ-aminopropyl)aminomethyl-triethoxysilane, N-(γ-aminopropyl)aminomethyl-tripropoxysilane, N-(β-aminoethyl)-β-aminoethyl-trimethoxysilane, N-(β-aminoethyl)-β-aminoethyl-triethoxysilane, N-(β-aminoethyl)-β-aminoethyl-tripropoxysilane, N-(β-aminoethyl)-β-aminoethyl-trimethoxysilane, N-(β-aminoethyl)-α-aminoethyl-triethoxysilane, N-(β-aminoethyl)-α-aminoethyl-tripropoxysilane, N-(β-aminoethyl)-β-aminopropyl-trimethoxysilane, N-(β-aminoethyl)-γ-aminopropyl-triethoxysilane, N-(β-aminoethyl)-γ-aminopropyl-tripropoxysilane, N-(β-aminoethyl)-γ-aminopropyl-trimethoxysilane, N-(β-aminoethyl)-β-aminopropyl-triethoxysilane, N-(β-aminoethyl)-β-aminopropyl-tripropoxysilane, N-(β- aminoethyl)-α-aminopropyl-trimethoxysilane, N-(β-aminoethyl)-α-aminopropyl-triethoxysilane, N-(β-aminoethyl)-α-aminopropyl-tripropoxysilane, N-(γN-aminomethyl-α -aminopropyl)aminomethyl-trimethoxysilane, N-(γ-aminopropyl)aminomethyl-triethoxysilane, N-(γ-aminopropyl)-aminomethyl-tripropoxysilane, N-(γ-aminopropyl)-β-aminoethyl-trimethoxysilane, N-(γ-aminopropyl)-β-aminoethyl-triethoxysilane, N-(γ-aminopropyl)-β-aminoethyl-tripropoxysilane, N-(γ-aminopropyl)-α-aminoethyl-trimethoxysilane, N-(γ-aminopropyl)-α-aminoethyl-triethoxysilane, N-(γ-aminopropyl)-α-aminoethyltripropoxysilane, N-(γ-aminopropyl)-γ-aminopropyl-trimethoxysilane, N-(γ-aminopropyl)-γ-aminopropyl-triethoxysilane, N-(γ-aminopropyl)-γ-aminopropyl-tripropoxysilane, N-(γ-aminopropyl)-β-aminopropyl-trimethoxysilane, N-(γ-aminopropyl)-β-aminopropyl-triethoxysilane, N-(γ-aminopropyl)-β-aminopropyl-tripropoxysilane, N-(γ-aminopropyl)-α-aminopropyl-trimethoxysilane, N-(γ-aminopropyl)-α-aminopropyl-triethoxysilane, N-(γ-aminopropyl)-α-aminopropyl-tripropoxysilane, hydrolysates of these silicon compounds, etc.

Now the invention is illustrated by way of working examples. In the following examples, abrasion resistance of the formed coating films was tested in accordance with the sand-falling method (ASTM D673-44) and "haze value" was determined according to the procedures of ASTM-D1003-61.

Surface hardness was tested by the method of JIS K5651, which is as follows.

The lead of a standard test pencil is exposed in the length of 3 mm without sharpening, the end surface of the exposed cylindrical lead is whetted flat on sand paper so that the circular peripheral edge of the end surface becomes sharp. The thus prepared pencil is positioned slant at the angle of 45° to the surface of a specimen to be tested. The end of the pencil lead is loaded with 1 kg, and the specimen is moved horizontally. The same test is repeated 5 times in different places on the surface. If scratches or break of the coating reaching the substrate is observed in two or more of 5 runs, the test is repeated with a pencil of one grade lower hardness. The hardness of the pencil, with which scratch is observed in less than 2 runs out of 5 runs, is indicated as the hardness of the test specimen.

Adhesion or bonding of the film coating to the substrate material was tested by the following cross-cut peel-off test method. A small grid-like pattern comprising 100 small 1 mm × 1 mm squares was provided on the surface of the coated film by using a razor blade to cut straight lines crosswise with 1 mm space therebetween deep enough to reach the substrate. Then a strip of cellophane adhesive tape was stuck onto the thus provided grid pattern and then the tape was jerked up in the direction perpendicular to the grid surface. The number of small squares of film remaining was counted; the indication 100/100 means there was no peel-off.

EXAMPLE 1

To a mixture of 100 ml of γ-methacryloxypropyl-trimethoxysilane and 50 ml of ethyl acetate, 5% of perchloric acid was added and the mixture was heated at 60° C for 5 hours to prepare a precoating solution. The solution was then applied on a substrate (3 mm thick plate) of polymethyl methacrylate and baked at 100° C for 30 minutes so as to cure the coating.

To 100 ml of N-(β-aminoethyl)-γ-aminopropyl-trimethoxysilane stirred at room temperature, 70 ml of ethanol and 30 ml of 10% aqueous potassium hydroxide solution was added and the mixture was stirred at 40° C for 48 hours to hydrolyse the silicon compound. To 80 ml of the resulting hydrolysis product, 1 ml of acrylic acid, 20 ml of hydroxyethyl methacrylate, 0.5 g of cobalt naphthenate as a curing catalyst and 100 ml of ethanol was added, and γ-rays emitted from cobalt 60 were applied to the mixture at a dose rate of 2 × 10⁶ roentgens per hour at room temperature for 2 hours to prepare an over-coating solution. This solution was applied on the cured precoating by dipping and then heated at 85° C for 24 hours to form a 20 μ thick cured over-coating. The film of these coatings showed the bonding strength of 100/100 in the cross cut peel-off test, its pencil hardness was 4H and the haze value measured after the sand-falling test was 20%.

A coating, which was formed by applying the over-coating solution directly on a polymethyl methacrylate substrate followed by curing under the same condition as above, showed the bonding strength of 0/100 in the peel-off test.

EXAMPLE 2

To 100 ml of γ-aminopropyltriethoxysilane were added 100 ml of ethanol and then 30 ml of 10% aqueous potassium hydroxide solution and the mixture was subjected to hydrolysis under stirring at room temperature for 24 hours to prepare a precoating solution.

The resulting solution was applied on a polymethyl methacrylate substrate and heated at 85° C for 2 hours to cure the precoating. To a mixture of 100 ml of γ-glycidoxypropyl-triethoxysilane and 20 ml of glycidyl methacrylate, γ-rays emitted from cobalt 60 were applied at a dose rate of 5 × 10⁵ roentgens up to a dose of 2 × 10⁶ roentgens and the resulting solution was applied on the cured coating of the precoating solution and heated at 90° C for 180 minutes.

The thus obtained transparent composite had a surface pencil hardness of 9H and a haze value of 11.9% when measured after the sand-falling test using 1380 g of sand. When rubbed with steel wool, the surface was hardly scratched. The bonding strength between the substrate and the coatings was 100/100 in the cross cut peel-off test.

When the cured over-coating was formed directly on the substrate without forming the precoating, the bonding strength between the substrate and the coating measured by the cross cut peel-off test was 0/100.

EXAMPLE 3

To 100 ml of vinyl-tris(methoxyethoxy)silane, tert-butyl hydroperoxide was added in a proportion of 0.5%, and the mixture was heated at 60° C for 45 minutes to prepare a precoating solution. This solution was then applied on the surface of a copolymer sheet consisting of 80% of methyl methacrylate, 10% of acrylonitrile and 10% of tetraethyleneglycol dimethyacrylate and heated at 100° C for 120 minutes so as to cure the coating.

To 100 ml of (3,4-epoxycyclohexyl)ethyl-trimethoxysilane was added 3% of perchloric acid dissolved in 5 cc of chloroform and the resulting solution was heated at 50° C for 30 minutes, then applied on the cured coating of the precoating solution and heated at 80° C for 180 minutes.

The thus obtained transparent composite had a surface hardness of 7H and a haze value of 15.4% measured after the sand-falling test. When rubbed with steel wool, the surface was scratched only slightly. The result of the cross cut peel-off test for determining the bonding strength between the substrate and the coatings was 100/100.

A transparent composite obtained by forming a cured coating of (3,4-epoxycyclohexyl)ethyl-trimethoxysilane directly on the substrate without applying and curing the precoating solution showed the bonding strength of 5/100 in the cross cut peel-off test.

EXAMPLES 4 – 7

Using the same procedure and the same materials as in Example 1, the precoating was formed on the substrate of polymethyl methacrylate Using the materials given in the list below instead of hydrolysate of N-β-(aminoethyl)-γ-aminopropyl-trimethoxysilane, acrylic acid, hydroxyethyl methacrylate in Example 1, the overcoating was formed on the precoated substrate under the same condition. The test results for the products are given below too.

| Example No. | Used Materials | Peel-off Test | Pencil Hardness | Haze Value |
|---|---|---|---|---|
| 4 | γ-glycidoxypropyl-triethoxysilane 80 ml glycidyl acrylate 20 ml | 100/100 | 9H | 11.5% |
| 5 | (3,4-epoxycyclohexyl)-ethyl-trimethoxysilane 80 ml glycidyl methacrylate 20 ml | 100/100 | 6H | 19.2% |

On the same precoated substrate, the over-coating was formed using the following materials, which were respectively applied on the substrate after being mixed with 1.5 ml of a 3% solution of perchloric acid in chloroform, and heated at 50° C for 60 minutes, and were heated at 80° C for 150 minutes.

| Example No. | Used Materials | Peel-off Test | Pencil Hardness | Haze Value |
|---|---|---|---|---|
| 6 | γ-glycidoxyethyl-trimethoxysilane 100 ml | 100/100 | 8H | 12% |
| 7 | hydrolysate of (3,4-epoxycyclohexyl)ethyl-trimethoxysilane 100 ml | 100/100 | 8H | 12.6% |

Also specimens consisting of the same substrate and the over-coating of the above materials formed under the same condition without precoating were tested. Both specimen gave 0/100 in the peel-off test.

EXAMPLES 8 – 11

Using the same procedure and the same materials as in Example 2, the precoating was formed on the substrate of polymethyl methacrylate.

Using the materials given in the list below instead of γ-glycidoxypropyl-triethoxysilane and glycidyl methacrylate in Example 2, the over-coating was formed on the precoating. Each mixture was mixed with 0.5 g of boron trifluoride-ethylether complex and irradiated under the same condition as in Example 2. Thereafter, the mixture was applied on the surface of the same precoated substrate and heated at 90° C for 180 minutes. The test results are given below, too.

| Example No. | Used Materials | Peel-off Test | Pencil Hardness | Haze Value |
|---|---|---|---|---|
| 8 | (3,4-epoxycyclohexyl)-propyl-trimethoxysilane 90 ml glycidyl acrylate 10 ml | 100/100 | 7H | 15.4% |
| 9 | hydrolysate of N-β-(aminoethyl)-γ-trimethoxysilane 80 ml hydroxypropyl methacrylate 20 ml acrylamide 2 g | 100/100 | 4H | 20.3% |

Also specimens consisting of the same substrate and the over-coating of the above materials formed under the same condition without precoating were tested. Both gave 0/100 in the peel-off test.

Further, using the materials given below, the over-coating was formed. Each material was mixed with 0.5 g of boron trifluoride-ethylether complex and heated at 50° C for 30 minutes. Thereafter, the mixture was applied on the surface of the precoated substrate and was heated at 90° C for 150 minutes. The test results are given, too.

| Example No. | Used Materials | Peel-off Test | Pencil Hardness | Haze Value |
|---|---|---|---|---|
| 10 | (3,4-epoxycyclohexyl)-propyl-trimethoxysilane 100 ml | 100/100 | 8H | 14.8% |
| 11 | N-(β-aminoethyl)-γ-aminopropyl-trimethoxysilane 100 ml | 100/100 | 5H | 20.1% |

EXAMPLES 12 – 15

Using the same procedure and the same materials as in Example 3, the precoating was formed on the substrate of the polymethyl methacrylate resin.

Using the materials given in the list below instead of hydrolysate of (3,4-epoxycyclohexyl)ethyl-trimethoxysilane in Example 3, the over-coating was formed on the precoated substrate under the same condition. The test results on the products are given below, too.

| Example No. | Used Materials | Peel-off Test | Pencil Hardness | Haze Value |
|---|---|---|---|---|
| 12 | γ-glycidoxypropyl-trimethoxysilane 100 ml | 100/100 | 9H | 11.2% |
| 13 | N-(β-aminopropyl)-γ-aminopropyl-trimethoxysilane 100 ml | 100/100 | 4H | 21.4% |
| 14 | hydrolysate of γ-glycidoxypropyl-trimethoxysilane 100 ml | 100/100 | 9H | 10.9% |
| 15 | hydrolysate of N-(β-aminopropyl)-γ-aminopropyl-trimethoxysilane 100 ml | 100/100 | 5H | 19.8% |

On the same precoated substrate, the over-coating was formed using the following materials. Each mixture was further mixed with 3% of perchloric acid (dissolved in 5 ml chloroform) and was irradiated with $1.5 \times 10^6$ roentgens of γ-rays from cobalt 60 at a dose rate of $1 \times 10^5$ roentgens per hour. Thereafter, the mixture was applied on the surface of the precoated substrate and was cured by heating at 90° C for 180 minutes. The test results on the products are given in the list, too.

| Ex. No. | Used Materials | Peel-off Test | Pencil Hardness | Haze Value |
|---|---|---|---|---|
| 16 | γ-glycidoxypropyl-trimethoxysilane 80 ml glycidyl methacrylate 20 ml | 100/100 | 8H | 12.9% |
| 17 | hydrolysate of N-(β-(aminoethyl)-γ-aminopropyl-trimethoxysilane 80 ml hydroxyethyl acrylate 20 ml | 100/100 | 4H | 20.6% |

Also specimens consisting of the same substrate and the over-coating of the above materials formed under the same condition without precoating were tested. Both gave 0/100 in the peel-off test.

EXAMPLES 18 – 23

A mixture of 100 ml of vinyltriethoxysilane and 1 g of benzoyl peroxide was heated at 70° C for 120 minutes so as to give a precoating solution. This solution was applied on the surface of a plate of a copolymer consisting of 80 parts by weight of methyl methacrylate unit and 20 parts by weight of diethyleneglycol diacrylate, and was cured by heating at 120° C for 120 minutes.

Over-coating materials were prepared by mixing each compound of mixture of compounds as listed below with 3% of perchloric acid and heating at 45° C for 30 minutes, and when the mixture contains polymerizable monomer of Group III, further irradiating said mixture with 1 × 10⁶ roentgens of γ-rays from cobalt 60 at a dose rate of 1 × 10⁵ roentgens per hour. The thus prepared over-coating material was applied on the precoated substrate and was cured by heating at 90° C for 180 minutes. The test results on the products are given in the list, too.

| Ex. No. | Used Materials | Peel-off Test | Pencil Hardness | Haze Value |
|---|---|---|---|---|
| 18 | γ-glycidoxypropyl-triethoxysilane 100 ml | 100/100 | 9H | 10.9% |
| 19 | γ-glycidoxypropyl-triethoxysilane 90 ml glycidyl methacrylate 10 ml | 100/100 | 9H | 11.2% |
| 20 | (3,4-epoxycyclohexyl)-ethyl-trimethoxysilane 100 ml | 100/100 | 8H | 13.0% |
| 21 | (3,4-epoxycyclohexyl)-ethyl-trimethoxysilane 100 ml | 100/100 | 7H | 15.2% |
| 22 | N-(β-aminoethyl)-γ-aminopropyl-trimethoxy-silane 100 ml | 100/100 | 5H | 20.1% |
| 23 | N-(β-aminoethyl)-γ-aminopropyl-trimethoxy-silane 80 ml hydroxyethyl methacrylate 20 ml | 100/100 | 4H | 20.6% |

When the overcoating of these materials were formed on the substrate without precoating, the results of the peel-off test were 0/100 for all the products.

What we claim is:
1. A transparent coated resin composite comprising:
a substrate of polymer consisting essentially of methyl methacrylate unit,
b. a precoating formed on said substrate of at least one silicon compound selected from the group consisting of:
methacryloxyalkyl-trialkoxysilanes represented by the formula

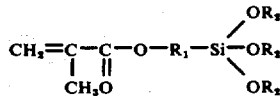

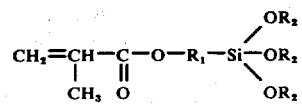

wherein $R_1$ is an alkylene group having 1 – 6 carbon atoms and $R_2$ is an alkyl group having 1 – 6 carbon atoms, and hydrolysates thereof;
aminoalkyl-trialkoxysilanes represented by the formula

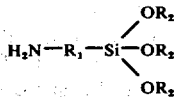

wherein $R_1$ and $R_2$ are as defined above, and hydrolysates thereof;
vinyltris(alkoxyalkoxy)silanes represented by the formula

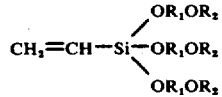

wherein $R_1$ and $R_2$ are as defined above, and hydrolysates thereof; and
vinyltrialkoxysilanes represented by the formula

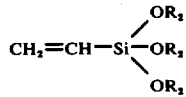

wherein $R_2$ is as defined above, and hydrolysates thereof; and
c. an over-coating formed on said precoating of at least one silicon compound selected from the group consisting of:
glycidoxyalkyl-trialkoxysilanes represented by the formula

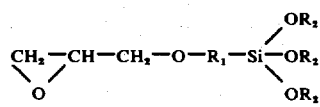

wherein $R_1$ and $R_2$ are as defined above, and hydrolysates thereof;
(3,4-epoxycyclohexyl)alkyl-trialkoxysilanes represented by the formula

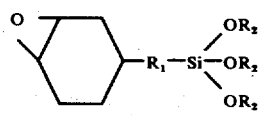

wherein $R_1$ and $R_2$ are as defined above, and hydrolysates thereof;

N-(aminoalkyl)-aminoalkyl-trialkoxysilanes represented by the formula

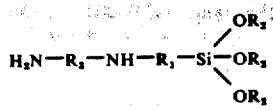

wherein $R_1$ and $R_2$ are as defined above and $R_3$ is an alkylene group having 1 – 6 carbon atoms, and hydrolysates thereof,
whereby the total thickness of the coating is in the range of 0.0001 – 0.5 mm.

2. The transparent coated resin composite as claimed in claim 1, wherein $R_1$ is an alkylene group having 1 – 4 carbon atoms, $R_2$ is an alkyl group having 1 – 4 carbon atoms, and $R_3$ is an alkylene group having 1 – 4 carbon atoms, and the total thickness of the coating is in the range of 0.001 - 0.1 mm.

3. The transparent coated resin composite as claimed in claim 2, wherein $R_1$ is an alkylene group having 1 – 3 carbon atoms, $R_2$ is an alkyl group having 1 – 3 carbon atoms, and $R_3$ is an alkylene group having 1 – 3 carbon atoms, and the total thickness of the coating is in the range of 0.001 - 0.05 mm.

4. A transparent coated resin composite comprising:
a. a substrate of a polymer consisting essentially of methyl methacrylate unit,
b. a precoating formed on said substrate of at least one silicon compound selected from the group consisting of:
methacryloxyalkyl-trialkoxysilanes represented by the formula

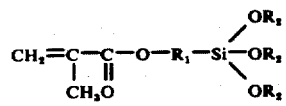

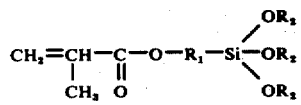

wherein $R_1$ is an alkylene group having 1 – 6 carbon atoms and $R_2$ is an alkyl group having 1 – 6 carbon atoms, and hydrolysates thereof;
aminoalkyl-trialkoxysilanes represented by the formula

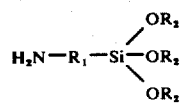

wherein $R_1$ and $R_2$ are as defined above, and hydrolysate thereof;
vinyltris(alkoxyalkoxy)silanes represented by the formula

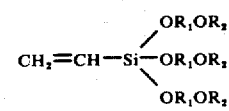

wherein $R_1$ and $R_2$ are as defined above, and hydrolysates thereof; and vinyltrialkoxysilanes represented by the formula

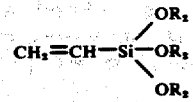

wherein $R_2$ is as defined above, and hydrolysate thereof; and
c. an over-coating formed on said precoating of (i) 98 – 50% by weight of at least one silicon compound selected from the group consisting of:
glycidoxyalkyl-trialkoxysilanes represented by the formula

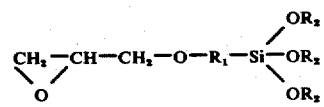

wherein $R_1$ and $R_2$ are as defined above, and hydrolysates thereof;
(3,4-epoxycyclohexyl)alkyl-trialkoxysilanes represented by the formula

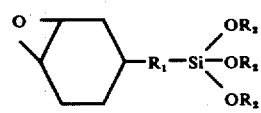

wherein $R_1$ and $R_2$ are as defined above, and hydrolysates thereof;
N-(aminoalkyl)-aminoalkyl-trialkoxysilanes represented by the formula

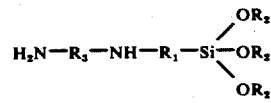

wherein $R_1$ and $R_2$ are as defined above and $R_3$ is an alkylene group having 1 – 6 carbon atoms, and hydrolysates thereof, and (ii) 2 – 50% by weight of a polymerizable monomer selected from the group consisting of glycidyl acrylate, glycidyl methacrylate, hydroxyethyl acrylate, hydroxyethyl methacrylate, hyroxypropyl acrylate, hydroxypropyl methacrylate, acrylic acid, acrylamide, methacrylic acid, metacrylamide, acrylic salts and methacrylic salts,
whereby the total thickness of the coating is in the range of 0.0001 – 0.5 mm.

5. The transparent coated resin composite as claimed in claim 4, wherein said over-coating is formed of (i) 95 – 60% by weight of said silicon compound of which $R_1$ is an akylene group having 1 – 4 carbon atoms, $R_2$ is an alkyl group having 1 – 4 carbon atoms, and $R_3$ is an akylene group having 1 – 4 carbon atoms and (ii) 5 – 40% by weight of said polymerizable monomer selected from the group consisting of glycidyl acrylate, glycidyl methacrylate, hydroxyethyl acrylate, hyroxyethyl methacrylate, hydroxypropyl acrylate, hydroxypropyl methacrylate, acrylic acid, acrylamide, methacrylic acid and metacrylamide, whereby the total thickness of the coating is in the range of 0.001 – 0.1 mm.

6. The transparent coated resin composite as claimed in claim 5, wherein said over-coating is formed of (i) 90 – 70% by weight of said silicon compound of which $R_1$ is an alkylene group having 1 – 3 carbon atoms, $R_2$ is an alkyl group having 1 – 3 carbon atoms, and $R_3$ is an alkylene group having 1 – 3 carbon atoms, and (ii) 10 – 30% by weight of said polymerizable monomer selected from the group consisting of glycidyl acrylate, glycidyl methacrylate, hydroxyethyl acrylate, hydroxyethyl methacrylate, hydroxypropyl acrylate and hydropropyl methacrylate, whereby the total thickness of the coating is in the range of 0.001 – 0.05 mm.

* * * * *